United States Patent [19]
Inbar et al.

[11] Patent Number: 5,890,305
[45] Date of Patent: *Apr. 6, 1999

[54] SELF-MASKING TRANSPARENCY VIEWING APPARATUS

[75] Inventors: Dan Inbar; Giora Teltsch, both of Haifa, Israel

[73] Assignee: Smartlight Ltd., Haifa, Israel

[*] Notice: The term of this patent shall not extend beyond the expiration date of Pat. No. 5,430,964.

[21] Appl. No.: 856,857

[22] Filed: May 15, 1997

Related U.S. Application Data

[63] Continuation of Ser. No. 358,603, Dec. 14, 1994, abandoned, which is a continuation of Ser. No. 861,982, Jun. 30, 1992, Pat. No. 5,430,964, which is a continuation-in-part of Ser. No. 537,799, Jun. 14, 1990, abandoned.

[30] Foreign Application Priority Data

Dec. 31, 1989 [IL] Israel .......................................... 092936

[51] Int. Cl.$^6$ .................................................... G02B 27/02
[52] U.S. Cl. ................................................. 40/361; 40/367
[58] Field of Search ............................. 40/361, 365, 367, 40/448, 518, 573; 362/97, 802

[56] References Cited

U.S. PATENT DOCUMENTS

| | | | |
|---|---|---|---|
| 1,988,654 | 1/1935 | Haag ........................................ | 40/361 |
| 2,436,162 | 2/1948 | Cadenas .................................... | 40/361 |
| 2,516,270 | 7/1950 | Swain . | |
| 2,754,605 | 7/1956 | Berkeley . | |
| 3,246,412 | 4/1966 | Sommerhoff ............................. | 40/361 |
| 3,249,691 | 5/1966 | Bigelow . | |
| 3,322,485 | 5/1967 | Williams . | |
| 3,492,486 | 1/1970 | Bischoff et al. ....................... | 40/361 X |
| 3,714,413 | 1/1973 | Craig . | |
| 3,953,764 | 4/1976 | Miller et al. . | |
| 4,004,360 | 1/1977 | Hammond ................................ | 40/361 |

(List continued on next page.)

FOREIGN PATENT DOCUMENTS

| | | |
|---|---|---|
| 0035382 | 9/1981 | European Pat. Off. . |
| 0165548 | 12/1985 | European Pat. Off. . |
| 0253379 | 1/1988 | European Pat. Off. . |
| 0352101 | 1/1990 | European Pat. Off. . |
| 0412757 | 2/1991 | European Pat. Off. . |
| 0436267 | 7/1991 | European Pat. Off. . |
| 2559923 | 8/1985 | France . |
| 1961126 | 7/1970 | Germany . |
| 3331762 | 3/1985 | Germany . |
| 9010889 | 1/1991 | Germany . |
| 3933988 | 4/1991 | Germany . |
| 64-84141 | 3/1989 | Japan . |
| 2050032 | 12/1980 | United Kingdom . |
| 2062930 | 5/1981 | United Kingdom . |
| 8903064 | 4/1989 | WIPO . |
| 9006537 | 6/1990 | WIPO . |
| 9110152 | 7/1991 | WIPO . |
| 9301564 | 1/1993 | WIPO . |

OTHER PUBLICATIONS

"Visual Psychophysics", D. Jameson et al., Springer–Verlag, 1972, pp. 78–83.
*Visual Psychophysics*, M. Alpern et al., pp. 43–49 and 54, 1972.
Patent Abstracts of Japan, vol. 13, No. 314, (p–899), Jul. 18, 1989 to Toshiba Corp.
Patent Abstracts of Japan, vol. 10, No., 206 (p–478), Jul. 18, 1986 of JP 61–046930 to Ricoh Co., Ltd.
Patent Abstracts of Japan, vol. 16, No. 562 (p–1456), Dec. 3, 1992 of JP 42–14532 to Matsushita Electric Ind Co..
Patent Abstracts of Japan, vol. 17, No. 387 (p–1576), Jul. 20, 1993 of JP 50–66403 to Hitachi Ltd.

(List continued on next page.)

*Primary Examiner*—Brian K. Green
*Attorney, Agent, or Firm*—Greenblum & Bernstein, P.L.C.

[57] ABSTRACT

A viewing apparatus for transparencies or the like masks any display areas not covered by transparencies by generating masks without moving parts, and adapts the luminance level of the image under study and of other display areas to the optimal viewing conditions required by the observer.

65 Claims, 9 Drawing Sheets

U.S. PATENT DOCUMENTS

| | | | |
|---|---|---|---|
| 4,118,654 | 10/1978 | Ohta et al. ................................. | 40/361 |
| 4,335,936 | 6/1982 | Nonomura et al. . | |
| 4,368,467 | 1/1983 | Unotoro et al. . | |
| 4,373,280 | 2/1983 | Armfield, III ......................... | 40/361 X |
| 4,378,557 | 3/1983 | Murata . | |
| 4,403,832 | 9/1983 | Tanaka et al. . | |
| 4,448,490 | 5/1984 | Shibuya et al. . | |
| 4,454,904 | 6/1984 | Oxman . | |
| 4,510,708 | 4/1985 | Pokrinchak ............................... | 40/361 |
| 4,637,150 | 1/1987 | Gelnk ......................................... | 40/361 |
| 4,707,080 | 11/1987 | Fergason . | |
| 4,775,918 | 10/1988 | Snyder . | |
| 4,799,083 | 1/1989 | Knodt ........................................ | 40/518 |
| 4,833,542 | 5/1989 | Hara et al. . | |
| 4,850,675 | 7/1989 | Hatanaka et al. . | |
| 4,855,725 | 8/1989 | Fernandez ............................. | 40/365 X |
| 4,859,037 | 8/1989 | Iwashita et al. . | |
| 4,901,155 | 2/1990 | Hara et al. . | |
| 4,908,876 | 3/1990 | Deforest et al. . | |
| 4,917,465 | 4/1990 | Conner et al. . | |
| 4,952,036 | 8/1990 | Gulick et al. . | |
| 4,966,441 | 10/1990 | Conner . | |
| 4,977,315 | 12/1990 | Purcell . | |
| 4,983,956 | 1/1991 | Salam . | |
| 5,124,818 | 6/1992 | Conner et al. . | |
| 5,155,608 | 10/1992 | Hatano . | |
| 5,159,363 | 10/1992 | Brauning . | |
| 5,313,726 | 5/1994 | Yaniv et al. ............................... | 40/361 |
| 5,430,964 | 7/1995 | Inbar et al. ............................... | 40/361 |
| 5,491,332 | 2/1996 | Inbar et al. . | |

OTHER PUBLICATIONS

Nehring et al., IEEE Transactions on Electron Devices, vol. ED–26, No. 5, May 1979, pp. 795–802.

T.N. Ruckmongathan, Conference Record of the 1988 International Display Research Conference, Papers presented at Hyatt Islandia, San Diego, California, Oct. 4–6, 1988.

H. Hamada et al., 1992 SID International Symposium, Digest of Technical Papers, First Edition, May 1992, pp. 269–272. "15.2: Brightness Enhancement of an LCD Projector by a Planar Microlens Array.".

IBM Technical Disclosure Bulletin, vol. 33, No. 9, Feb. 1991, High Efficiency Back Light for LCD, pp. 261–262.

Patent Abstract of Japan, vol. 17, No. 464 (P1599).

Jameson et al., "Visual Psychophysics", pp. VII, VIII, 43–49,54 and 78–101, 1972.

E. Kaneko, "Liquid Crystal TV Displays: Principles and Applications of Liquid Crystal Displays", pp. 77–137.

T.N. Ruckmongathan et al., Japan Display 1992, "S3–4 New Addressing Technique for Fast Responding STN LCDs", pp. 65–68.

K. Tarumi et al. Japan Display 1992, "S15–5 On the Relationship between the Material Parameters and the Switching Dynamics in Twisted Nematic Liquid Crystals", pp. 587–590.

P.M. Alt et al., IEEE "Transactions on Electron Devices" vol. ED–21, No. 2, Feb. 1974, pp. 146–155.

Werner E. Haas, *Liquid Crystal Display Research:* The First Fifteen Years, vol. Cryst. and Liq. Crys, vol. 94, pp. 1–31 (1983).

*Liquid Crystals, Nature's Delicate Phase of Matter*, by Peter J. Collings, Princeton University Press, 1990, Chapter 2, pp. 24–34.

Stephen Balter, et al., *Radiographic Viewing Conditions*, published in the conference proceedings of "Application of Optical Instrumentation in Medicine, 2nd Seminar," SPIE, 29–30 Nov. 1973 pp. 225–227.

J. Blair Hartley, *Film Viewing 1996*, (Ro–B1 20, Yr. 2/67), pp. 96 and 97.

Gerd Rosenbusch, *Radiology in Medical Diagnostics*, 1994, p. 465.

*Physiologishe Problems der Betrachtung des Rontgenbildes* (Psychological Problems in Viewing Radiograph) by Rainer Rohler, dated Feb. 1967, pp. 79 and 86–96 and English translation titled "Physiological Problems of Reading Radiographs" (Ro–B1, 20 Yr. 2/67).

D.P. Carmody et al., "Global and Segmented Search for Lung Nodules of Different Edge Gradients", Investigative radiology, May–Jun. 1980, vol. 15, No. 3, pp. 224–233.

SELF-MASKING TRANSPARENCY VIEWING APPARATUS

This application is a continuation, of application Ser. No. 08/358,603, filed Dec. 14, 1994, now abandoned, which is a continuation of application Ser. No. 07/861,982, filed Jun. 30, 1992, now U.S. Pat. No. 5,430,964, which is the National stage of PCT/EP91/00065, filed Dec. 28, 1990, which is a continuation-in-part of application Ser. No. 07/537,799, filed Jun. 14, 1990, now abandoned.

FIELD OF THE INVENTION

The present invention relates generally to a transparencies viewing device, more particularly, to apparatus for holding and illuminating X-ray and like transparencies.

BACKGROUND OF THE INVENTION

Medical X-ray transparencies usually are examined by placing them over the display area of a device commonly referred to as an illuminator. Conventional illuminators normally comprise a box-like structure enclosing fluorescent lighting tubes behind a semi-transparent light diffusing display plate defining the display area. Commonly, transparencies are retained on the surface of the display plate by pushing the upper edge of the transparencies under spring-loaded film-holder clips located along the top edge of the display plate.

Standard size illuminators have a display plate 17 inches high and 14 inches or multiples of 14 inches (i.e. 28 inches or 56 inches) wide. Usually, each 14 inch width of display plate has its own fluorescent tubes and control switch. Such display plates enable viewing full size X-ray films which measure 17 inches by 14 inches. In such cases, the sections of the display plate not covered by transparencies need not be illuminated. This eliminates unnecessary glare from areas outside the transparency.

When transparencies smaller than 14 inches by 17 inches are to be examined, they are typically retained on the display area in the same manner as full size transparencies, i.e., suspending them by means of the film-holders along the top of the viewer. This leaves a portion of the display area surrounding the transparencies fully illuminated and the resulting additional glare detracts from the visual perception of the person trying to study the transparency and assess the information it contains.

Often, transparencies contain several very transparent areas, and frequently, radiologists have to examine overexposed transparencies. In these cases, considerable glare emanates through areas of the transparencies themselves.

An important factor in the interpretation of transparencies, is the ability to discriminate between various levels of light. This ability is determined by the Weber Law. E. H. Weber found that "the minimum perceptible difference in a stimulus is proportional to the level of the stimulus". Stated in terms of vision, as formulated by Fechner, $\delta L/L=K$ (Weber constant); Where $\delta L$ is the minimal detectable difference in luminance; and L is the luminance, see "Elemente der Psychophysic", G. T. Fechner, Leipzig, 1860, and "Visual Psychophysics", D. Jameson and L. M. Hurvich (ed.), Berlin, 1972.

Accordingly, if the eye is adapted to luminance L, $\delta L$ is determined. For a radiologist, maximal gray level discrimination is desired. Therefore, the observer's eye should be adapted to the luminance level of the image under study. In less benign conditions, a person reading an X-ray will be less able to perceive critical but minor shadings and nuances in the transparency. Moreover, protracted inspection of display areas under less benign conditions involves significant eye strain on the part of the observer.

While it is of course feasible for an observer to overlay masking strips on the display area and thus block unwanted and contrast-reducing light passing through the diffuser, as a practical matter, readers of X-rays rarely resort to such practice.

Attempts have been made in the past to provide viewing devices for X-ray transparencies which shield the eyes of the observer from light emanating from light sources other than the light passing through the transparencies, to obscure light in parts of the transparencies, and to reduce the contrast in transparencies when so required. However, these devices do not adapt the level of light to the transparency or to the sections being studied in the transparency.

In U.S. Pat. No. 1,988,654 to Haag, there is disclosed a light box which incorporates two manually movable curtains for masking all of the light transmitting surfaces of a diffuser up to the edges of a transparency.

U.S. Pat. No. 2,436,162 to Cadenas discloses an X-ray viewer having a masking arrangement incorporating a plurality of hingedly connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In accordance with such device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those of the holes not covered by the transparencies, so that passage of light through such holes is prevented. Air cannot pass through those of the holes in registry with the transparencies and, thus, the shutters associated with the covered holes remain open for the passage of light. The device described is unsuitable for critical X-ray transparencies inspection since the presence of holes and shutters in the viewing screen in the areas in registry with the transparencies creates a pattern behind the transparencies which interferes with the ability to accurately read them.

U.S. Pat. No. 4,373,280 to Armfield discloses an X-ray viewing plate having a cross bar for supporting transparencies at a central portion of the screen. A series of shades is provided which may be manually activated to obscure selected parts of the illuminated surface.

U.S. Pat. No. 4,510,708 to Porkinchak discloses an X-ray viewing device which includes a series of masks on an elongated scroll. In a specific embodiment, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a film-holder. The widthwise sensing function is performed by a series of levers or fingers positioned to engage an edge of the film.

U.S. Pat. No. 4,637,150 to Geluk describes a system in which a cathode ray tube is used as a light source and the light is light emitted by this source is modulated in accordance with the stored density of a a transparency. This system is impractical due to the limited sizes and associated light outputs for this type of illuminator.

SUMMARY OF THE INVENTION

The apparatus of the present invention comprises an illumination means typically provided as a conventional primary illuminator, which can be a battery of fluorescent bulbs and reflectors mounted on a chassis, or contained in a box-like structure. Additionally the apparatus comprises a mask pattern generating device, which may be an electrically-controlled Liquid Crystal Array (LCA). In addition, there is provided a transparency detection system, such as optical sensors which recognize optical properties, such as attenuation, on the display area including areas covered by transparencies and the face of the transparencies themselves. The detection data is transferred to a system control unit, which drives the LCA to produce a complementary masking pattern in conformity with the displayed transparencies, masking all other areas of the display area.

In one or more alternative embodiments of the present invention, the LCA is provided in several layers, or includes rectangular segments, or combination thereof. The LCA layer or layers may be arranged in the pattern of a matrix or matrices where the size of a matrix cell is larger than 4 mm$^2$. The LCA may include an active matrix type. Alternatively, the LCA segments may be a plurality of segments in the shape of parallel stripes, wider than 2 mm, across the display area. The stripes may also be divided across into shorter segments.

In a particular embodiment, at least two LCA layers are provided segmented in substantially dissimilar fashion. The LCA itself may be a Polymer Dispersed Liquid Crystal.

In another particular embodiment, the mask pattern generating device may be one or more Thermo-Optical Liquid Crystal devices.

In still another particular embodiment, the LCA may be replaced by one or more Electrochromatic Metal Oxide devices.

In another particular embodiment, the detection of loci occupied by transparencies or parts thereof in the display area is realized through the operation of electro-optical detection means, using differences in attenuation and/or reflection of light to sense differences between the loci of transparencies or parts thereof and between other areas of the display area.

In yet another particular embodiment, the detection system is realized through the operation of one or more geometric gauges, which sense thickness, and/or length, and/or width of said transparency, thus differentiating between loci of transparencies or parts thereof, and between other areas of the display area.

In another particular embodiment, the detection system is provided by the operation of one or more sets of electric contacts, including specifically sets of contacts positioned in or adjacent to the film-holders. The electric conductivity state of said contacts is changed through the isolating effect of the transparency or parts thereof in some of the contacts, thus indicating the location of the transparency.

In yet a further particular embodiment, the detection system is provided by the operation of one or more acoustic transmitting and detection means, which sense differences in acoustic properties between loci of transparencies and between other areas of the display area.

In still another particular embodiment, the detection system is provided by the operation of one or more capacitance detection systems, comprising an array of electrodes and associated electronic circuitry. The associated electronics sense changes in capacitance between electrodes, including between neighboring electrodes, including change in capacitance caused through the presence of transparency or parts thereof.

In a preferred embodiment, which includes electrically-operated LCA segments and a capacitance detection system, the array of LCA electrodes includes electrodes of the detection system.

In another particular embodiment, the detection system is provided by the inclusion of a manual command for control of electric control means. In this embodiment, sensors detect position or positions indicated by the operator, and specifically positions on, and/or adjacent to, the transparencies.

In another preferred embodiment, the positioning of reference positions of transparencies, such as a corner of a transparency, is limited to pre-indicated locations in a display area. Since transparencies have dimensional standard sizes, this embodiment simplifies the detection of loci occupied by transparencies, and simplifies the positioning of sensors, so as to reduce and determine the patterns of the LCA segments.

A feature of the present invention which further improves visual perception of details of a transparency, is the provision of a Region Of Interest (ROI) mode of operation. The ROI may include selection of one or more areas of the display area or the transparencies where relative enhancement of light transmission and/or one or more areas where relative reduction of light is required. In the ROI, the selected areas will have relative enhancement of light transmission, while in other selected areas light transmission will be reduced, in one or more degrees.

In a preferred embodiment, the electro-optical detection includes mapping of light attenuation and/or light reflection on the transparencies. The mapping of transparencies is useful to attain greater uniformity of light emanating from said transparencies, in addition to the reduction of light in areas of the display area, through relative reduction of light transmitted to more transparent parts of the transparencies and to other parts of the display area.

In another particular embodiment, the viewing device may have attached to it an apparatus for change of transparencies from a magazine where the transparencies are brought laterally from the magazine to the display area, variously known as a film alternator or motorized viewer. In such an alternator, sensing of incoming transparencies and their scanning is carried out during transport of transparencies into the magazine or from the magazine to their station in the display area. The scan uses the lateral motion of the transparencies to detect loci of transparencies on the display area and/or to detect spatial distribution of light transmission of the transparencies and/or of parts thereof.

In a further particular embodiment, the scanning may be used to attain greater uniformity of light emanating from the transparencies, in addition to the reduction of light in areas of the display area, through the LCA effecting relative reduction of light transmitted to more transparent parts of the transparencies and to other parts of the display area.

In a further embodiment, the sensors detect an operator indication, pointing via the fingers or otherwise, to distinguish between instructions to enhance or reduce light in the ROI in accordance with an operator-selected mode.

In another embodiment, the Manual Control Mode is realized by inclusion of a touch screen device using an Optical, and/or a Capacitive, and/or a Resistive, and/or a Pressure Membrane, and/or a Load Sensitive (Piezoelectric) Surface, and/or an Acoustic Wave touch screen method. The touch screen may be provided in, or adjacent to the display area of the viewing device to detect, within the viewing field of the viewing device, a position or positions indicated by the operator, including specifically positions on, and/or adjacent to, the transparencies, to activate the LCA or other system mask pattern generation accordingly.

In a preferred embodiment, the touch screen is used to convey the operator's indication in order to attain variation of light distribution adapted to the wishes of the observer.

In another embodiment, the relative light transmission in an area spreads or contracts in planar fashion in response to a prescribed indication.

In another preferred embodiment, specified, or otherwise indicated regions of interest will receive an amount of illumination commensurate with the wishes of the radiologist.

It is another feature of the present invention that the intensity of light emanating from the primary illuminator is made spatially nonuniform, functionally related to the loci of transparencies or parts thereof in the display area.

It is still another feature of the present invention that the viewing device includes control of the relationship between illumination of the viewing room and the transparencies.

In still another embodiment, the illumination means comprises a primary illuminator which includes a mask, positioned on or adjacent to the light sources, transmitting less light in the direct light path from the light sources to the observer.

In a further embodiment, the mask included in the primary illuminator has light reflecting areas facing the light sources and has more closely knit reflective surfaces in the path of direct light from said light sources to the observer.

In another application, instead of a viewing device, a projection device is provided, for projecting on to a screen images from transparencies such as photographic transparencies, slides or drawings. A segmented LCA affords relative dimming of parts of the projected field, through electro-optical modulation of the light transmission by electric means.

In still another application, the device is provided as a microscope. A segmented LCA affords relative reduction of light in parts of the transparency, through electro-optical modulation of the light transmission by electric means.

In another embodiment, the LCA is comprised of a liquid crystal material and associated electrodes applied to at least one plastic substrate.

Thus, the invention achieves considerable conformity of the luminance of the environment to the luminance of the area under study, resulting in a significant improvement of visual perception of the detail to be studied, and approximating the optimal viewing conditions in accordance with Weber's Law.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which like numerals designate corresponding sections or elements throughout, and in which.

DETAILED DESCRIPTION OF THE PREFERRED EMBODIMENTS

As described herein, the present invention employs several sub-systems and encompasses for some of them several alternative methods of operation, thus resulting in a large number of permutations. This detailed description illustrates a few such embodiments and variations according to the invention. Other combinations are also useful and fall within the scope of the invention.

Figure 1:
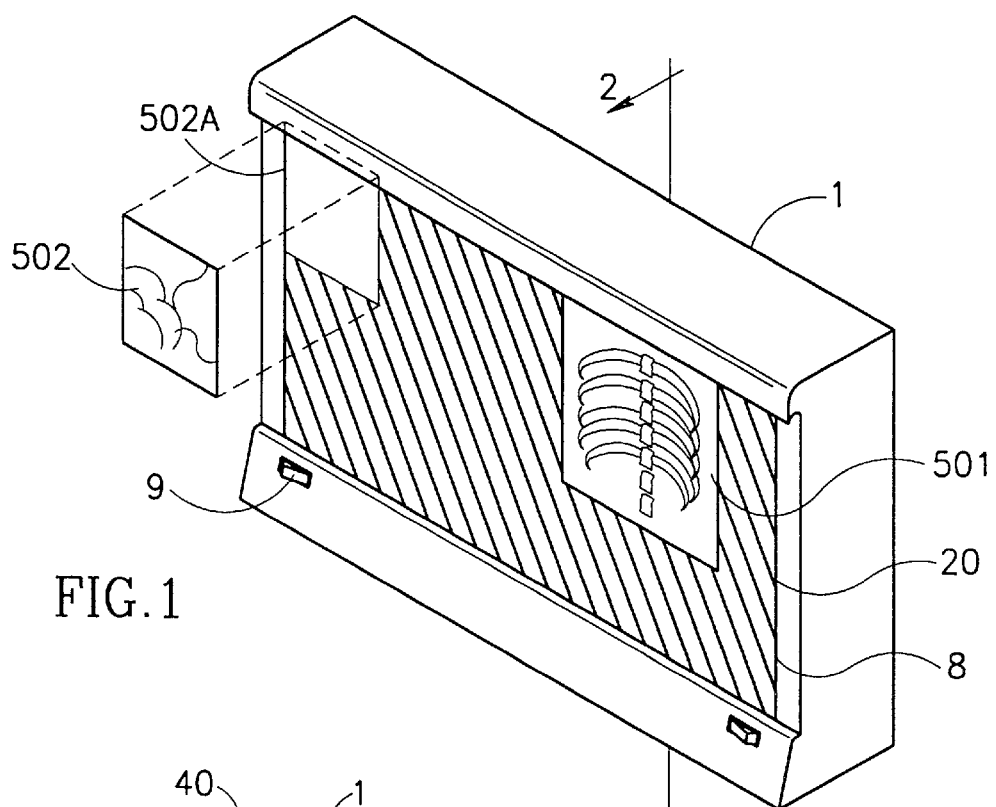
FIG. 1 is a perspective view of a viewing device constructed and operated in accordance with the principles of the present invention, provided with a Masking Pattern Generator, a transparencies detection means and two transparencies.
Figure 2:
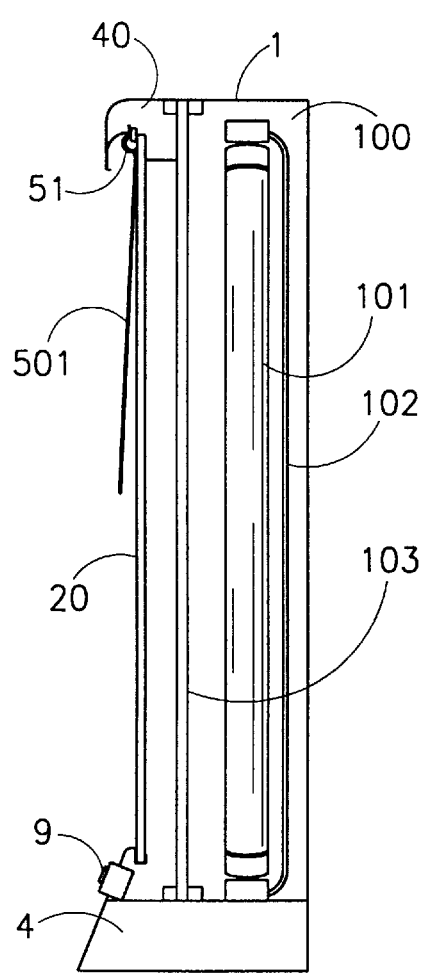
FIG. 2 is a cross-section of the viewing device of FIG. 1, showing a primary illuminator comprising light source and reflectors, a Masking Pattern Generating device, a film-holding clip, a transparency detection means, an Electronic Control Unit and a transparency.
Figure 3:
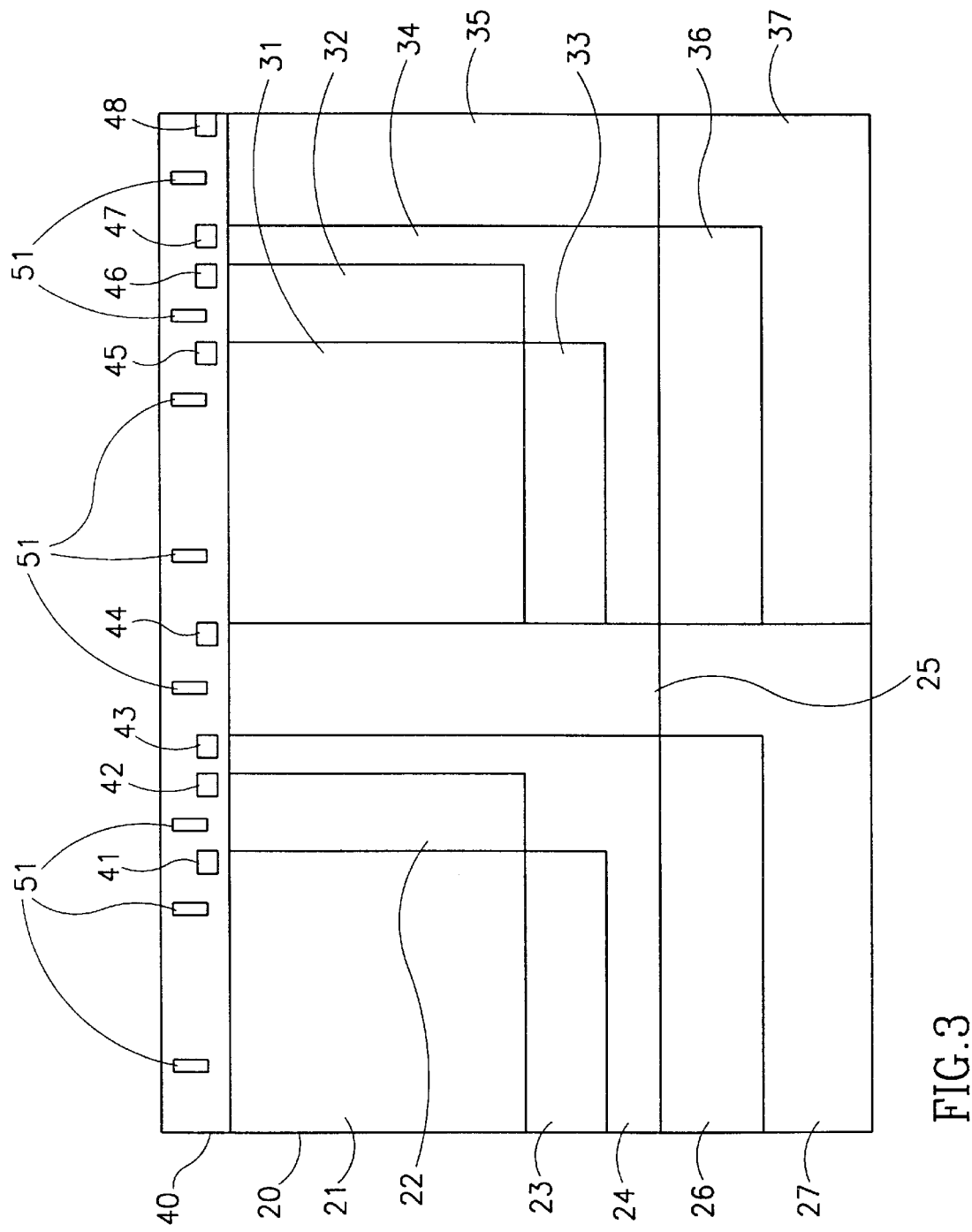
FIG. 3 is a front view of the Masking Pattern Generator, including film-holders and a transparency detection system which uses pre-indicated set locations for reference locations of the transparencies.

Referring now to FIG. 1, there is illustrated an embodiment of a viewing device 1 constructed in accordance with the present invention. Viewing device 1 has a display area 8 sufficiently large that two X-ray transparencies 501 and 502 can be simultaneously presented for inspection. A cross-sectional view of viewing device 1, taken along section lines 2—2 is illustrated in FIG. 2. Device 1 includes a primary illuminator 100 as an illumination means, comprising fluorescent bulbs 101 as a light source, reflectors 102, and a diffuser plate 103. viewing device 1 also includes a power switch 9. The specific embodiment illustrated in FIGS. 1–4 is useful for standard sizes of transparencies. In this embodiment, the positioning of reference location of transparencies 501 and 502 on device 1 is in pre-indicated positions, e.g., the transparencies upper left corners.

The front part of device 1 includes an Electro-Optical Masking Device (EOMD) 20. As best seen in the front view of FIG. 3, the EOMD is embodied in a Liquid Crystal Array (LCA), including segments 21 through 37. In the embodiment illustrated here, transparencies 501 and 502 are held for display by film-holders 51. The loci of the transparencies in the display area is recognized by sensors 41 through 48 which in these illustrations are situated in sub-assembly 40. In a preferred embodiment of the invention each sensor comprises a set of electrical contacts which are separated by the presence of the transparency. In another preferred embodiment of the invention the sensors are acoustic sensors which are covered by the transparency when it is present. Ultrasonic waves emitted by a speaker (not shown) are attenuated by the transparency indicating its presence.

Figure 4:
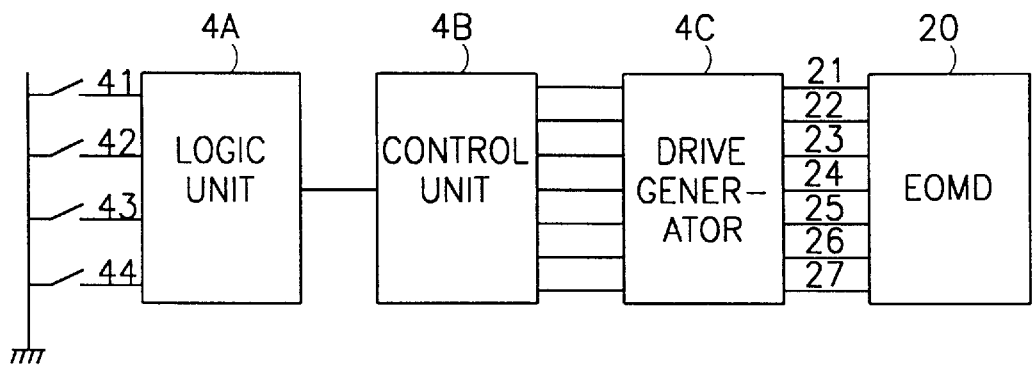
FIG. 4 is a block diagram of the electronic circuitry featuring the transparency detection system of the embodiment of FIG. 3.

Viewing device 1 has a left-hand module comprising an Electric Control Unit 4 which is illustrated in the Electronic Block Diagram of FIG. 4, including sensors 41 through 44, embodied in electric contacts, and determining the state of the LCA segments 21 through 27. The electronic blocks of FIG. 4 include electronic logic unit (block 4A) identifying a loci of transparencies, logic control unit (block 4B), and LCA Drive Generator (block 4C). An identical module to the one seen in FIG. 4 includes sensors 45 through 48 and LCA segments 28 through 37. Each such segment is individually controlled by an LCA Drive Generator which is in block 4C.

As is evident to a person skilled in the art by inspection of FIGS. 1–4, the LCA 20 blocks light emanating from the primary illuminator 100, if no transparencies are mounted. When, for example, a transparency 502 is mounted on the left-hand upper corner of viewing device 1, only the sensor 41 is activated. Therefore, Logic Control Unit 4B interprets this activation according to the pre-set Truth Table 1 (below), as a vertical placement of an 8"×10" transparency at the upper left corner of the left module.

TABLE 1

TRUTH TABLE.

| Film Size | Film Orientation | Sensors Activated | LCA Segments Activated |
|---|---|---|---|
| A | 8" × 10" | Vertical | 41 | 21,23 |
| B | 8" × 10" | Horizontal | 41,42 | 21,22 |
| C | 11" × 14" | Vertical | 41,42,43 | 21,22,23,24,26 |
| D | 11" × 14" | Horizontal | 41,42,43,44 | 21,22,23,24,25 |
| E | 14" × 17" | Vertical | 41,42,43,44 | 21,22,23,24,25,26,27 |

Accordingly, the Logic Control Unit 4B commands Drive Generator 4C to turn segments 21 and 23 into a light transmitting mode. On the left-hand module of device 1, the area 502A, which is the area covered by transparency 502, is uniformly illuminated. Similarly, transparency 501 activates a masking pattern on the right-hand module of device 1. As will be appreciated, the observer of transparencies 501 and 502, can examine these transparencies free of any glare from other parts of the display area of viewing device 1. Similarly, different sizes or orientations of transparencies would activate other LCA segments in accordance with Table 1, thus providing masking patterns registering with the loci of the transparencies on display.

Figure 5:
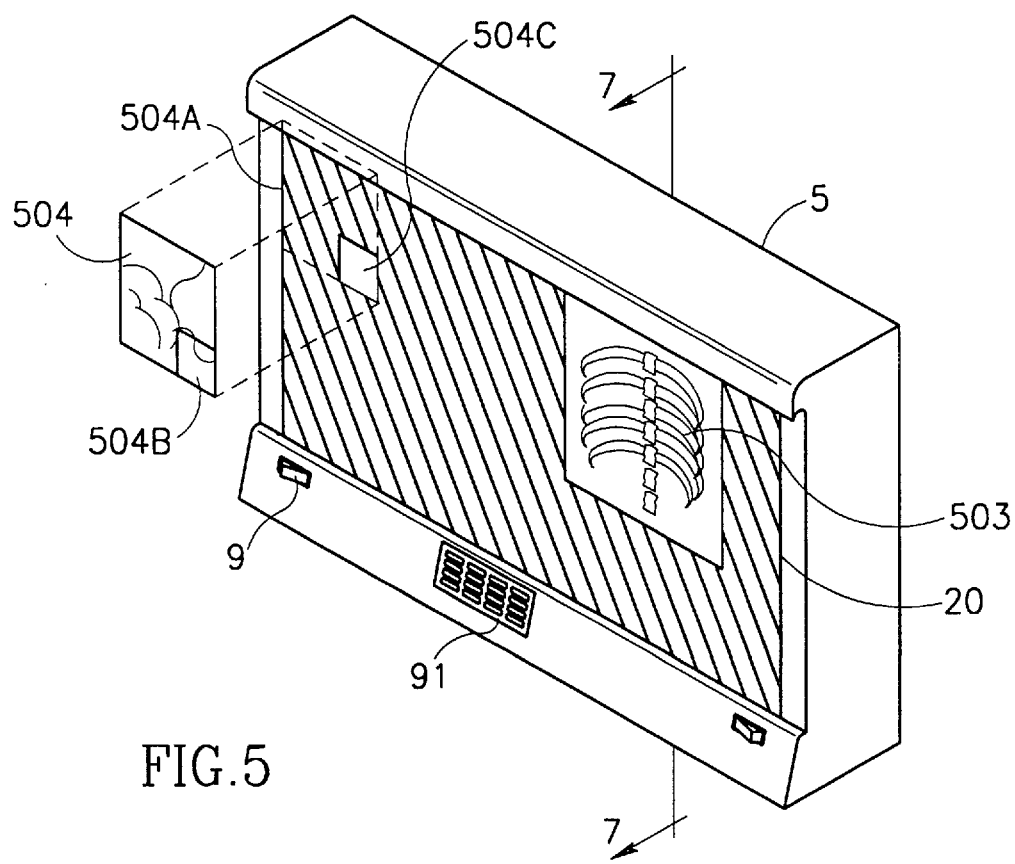
FIG. 5 is a perspective view of an alternative embodiment of the viewing device of FIG. 1, provided with a Masking Pattern Generator, a transparencies detection means, Touch Screen, two transparencies and a Region Of Interest (ROI)
Figure 6:
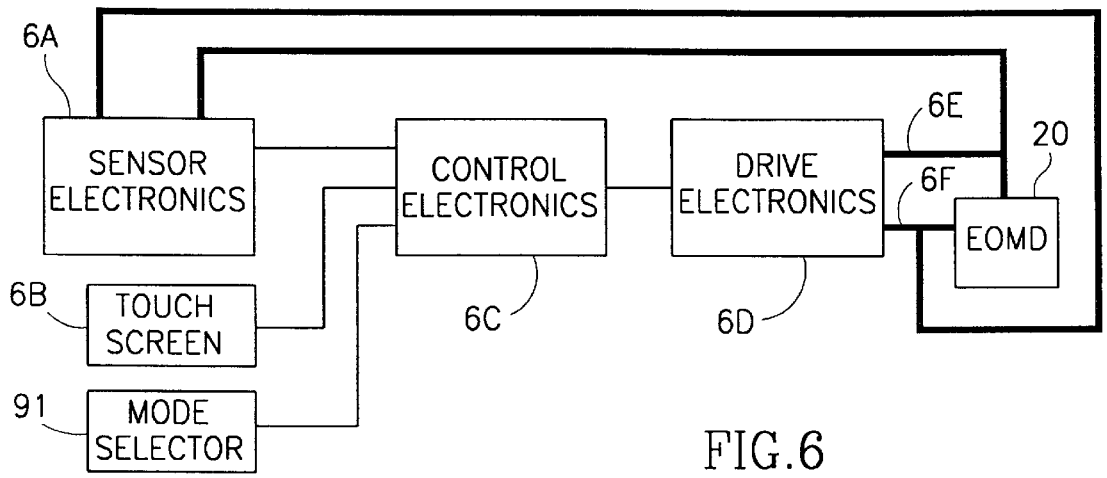
FIG. 6 is a block diagram of the electronic circuitry featuring the matrix LCA Masking Pattern Generator and Touch Screen of the embodiment of FIG. 5.
Figure 7:
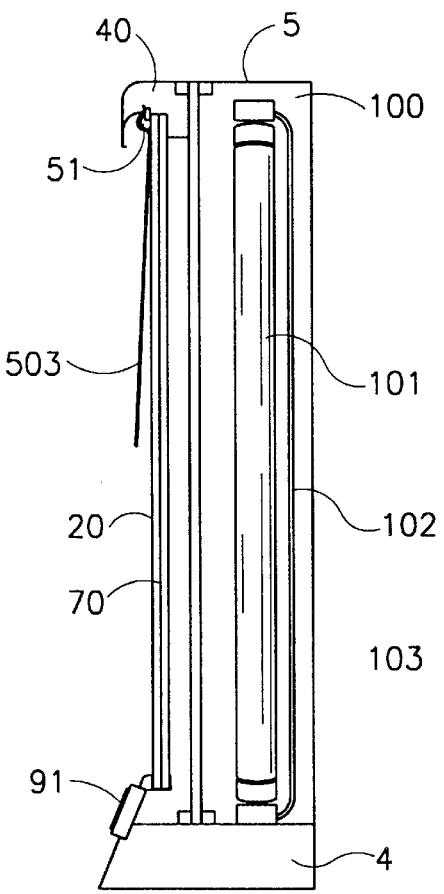
FIG. 7 is a cross-section of the viewing device using the matrix LCA Masking Pattern Generator and Touch Screen of FIG. 5, and showing the primary illuminator.

Another embodiment of the invention is illustrated as a viewing device 5 in FIG. 5, and a cross-section taken along section lines 7—7 is illustrated in FIG. 7. The EOMD 20 is an LCA Mask Pattern Generator, illustrated in FIG. 8, segmented into a matrix. The blocks of the Electronic Block Diagram of FIG. 6 include Capacitive Sensor Electronics (block 6A), a Touch Screen Device (block 6B), Control Electronics (block 6C), and Drive Electronics (block 6D).

The detection of loci of transparencies 503 and 504 is achieved through capacitance changes between electrodes of the LCA in the loci where transparencies 503 and 504 are present. The LCA matrix is an active matrix and as illustrated in the Block Diagram of FIG. 6, wiring bus 6E and 6F control the columns and rows of the active matrix respectively, and drive Capacitive Sensor Electronics (CSE) 6A. The CSE 6A measures changes in inter-electrode capacitance and determines therefrom the loci of transparencies 503 and 504. This data is fed into the Control Electronics 6C, and the Control Electronics 6C commands Drive Electronics 6D to activate light transmission at the loci of the transparencies.

Touch Screen space 70 is a Pressure Membrane Touch Screen device. Thus for example, if the observer of transparencies wants to study a Region Of Interest (ROI) 504B in transparency 504, and desires to have only that ROI 504B lighted, the observer would indicate an outline of his ROI 504B, within space 70, after switching to ROI Mode in Mode Selector 91. The operator indication activates Touch Screen Device 6B which, in turn, reports the locus of ROI 504B to Control Electronics 6C, resulting in the masking of light by the LCA 20 in all areas of display, except 504C (FIG. 5), which is the ROI. Similarly, the Mode Selector 91 can select a Dim Mode, a Area Contract Mode, or an Area Explode Mode, whereby the Touch Screen Device 6B, Control Electronics 6C and LCA 20, are operative to dim the light in the ROI, or to contract or explode the area of the ROI, respectively.

Turning now to FIGS. 9 through 12, another embodiment of the invention is illustrated. The viewing device 11 in FIG. 9 has attached thereto an apparatus for change of transparencies, in which the transparencies are brought laterally from the magazine area, typically located inside device 11, to the display area 620. An optical bar scanner 640 utilizes the lateral motion of the transparencies to anticipate the spatial distribution of light in the whole of double display area 620. The loci of transparencies 505 through 508 and the optical transmission of parts thereof are registered and serve to control LCA plate 620.

Figure 10:
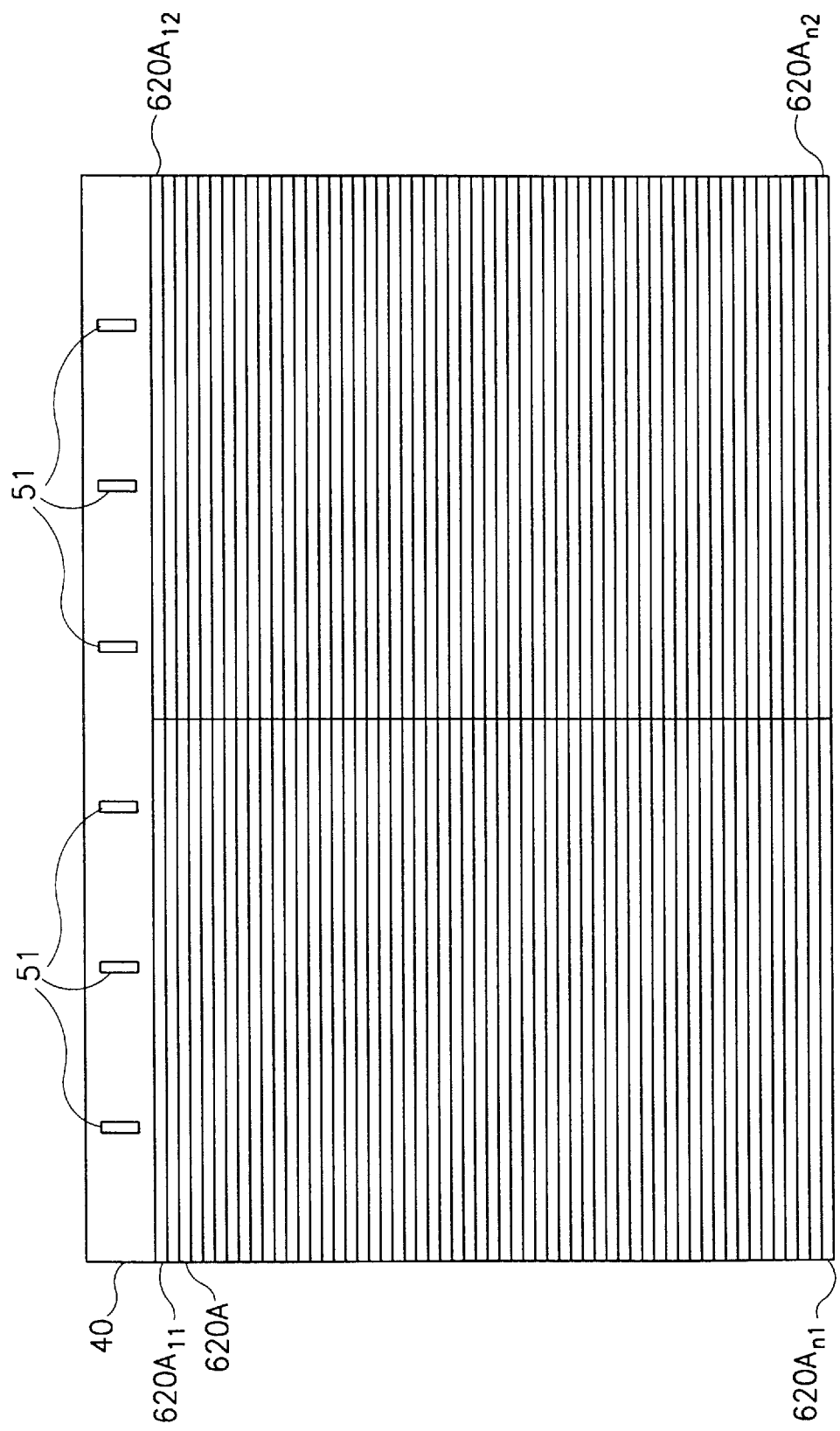
FIG. 10 is a front view of an LCA Masking Pattern Generator using a segmented horizontal stripe pattern, and including film-holders.
Figure 11:
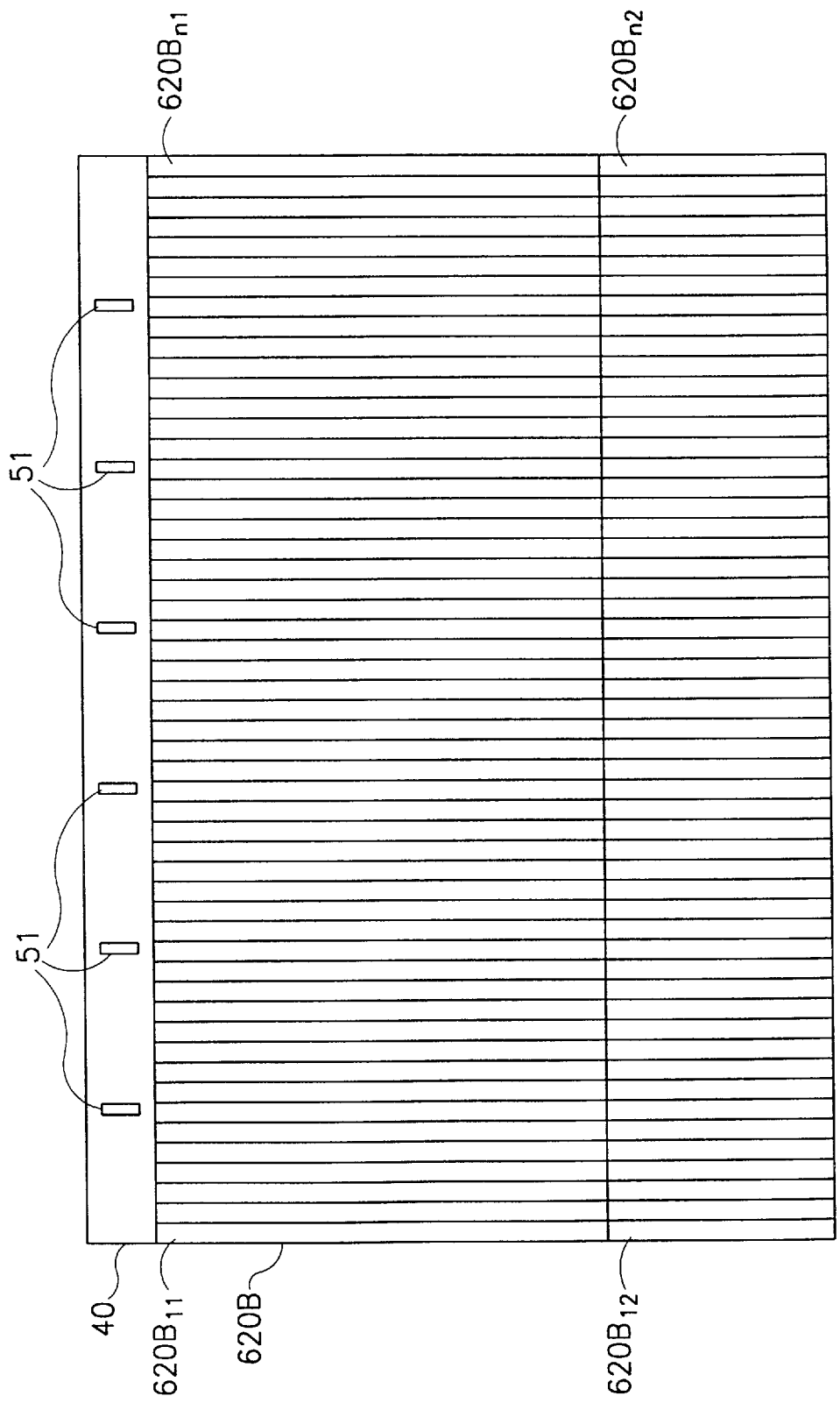
FIG. 11 is also a front view of an LCA Masking Pattern Generator using segmented vertical stripe pattern, and including film-holders.

In FIGS. 10 and 11, a particular embodiment of LCA plate 620 is illustrated. The LCA 620A in FIG. 10 is segmented to horizontal parallel stripes $620A_1$ through $620A_j$ to $620A_n$, across the plate. Each stripe is divided across into two segments $620A_{11}$, $620A_{12}$, ... $620A_{n1}$, $620A_{n2}$. The LCA plate 620A is mounted in front of, and adjacent to LCA Plate 620B illustrated in FIG. 11, which is segmented into vertical parallel stripes $620B_1$ through $620B_j$ to $620B_n$ across the plate, and in which each stripe is divided across into two segments, creating segments $620B_{11}$, $620B_{12}$, ... $620B_{n1}$, $620B_{n2}$. Jointly the two LCAs 620A and 620B achieve a matrix effect of the EOMD. The data is relayed by Bar Scanner 640 to the Control Electronics 12C, and the Control Electronics 12C commands Drive Electronics 12D to activate light transmission in the rows of LCA 620A and in the columns of LCA 620B which correspond to the loci of transparencies 505 through 508. Preferably the width of the stripes is greater than 2 mm each.

In a preferred embodiment of the invention control electronics 12C is utilized to calculate the average transmission of light through the transparency. The term "average transmission" as used herein is an overall transmission value to which the vision of the observer adapts. This value is fed to Drive Electronics 12D which now functions to adjust the attenuation of the LCA elements outside the area of the transparency to provide a light level outside the area of the transparency which is substantially equal to the average light level over the transparency. This "gray" border provides better adaptation of the eye to the average light level of the transparency.

In a further improvement, Control Electronics 12C is operative to control the room lighting to provide for even better adaptation of the eye to the transparency light level.

Figure 8:
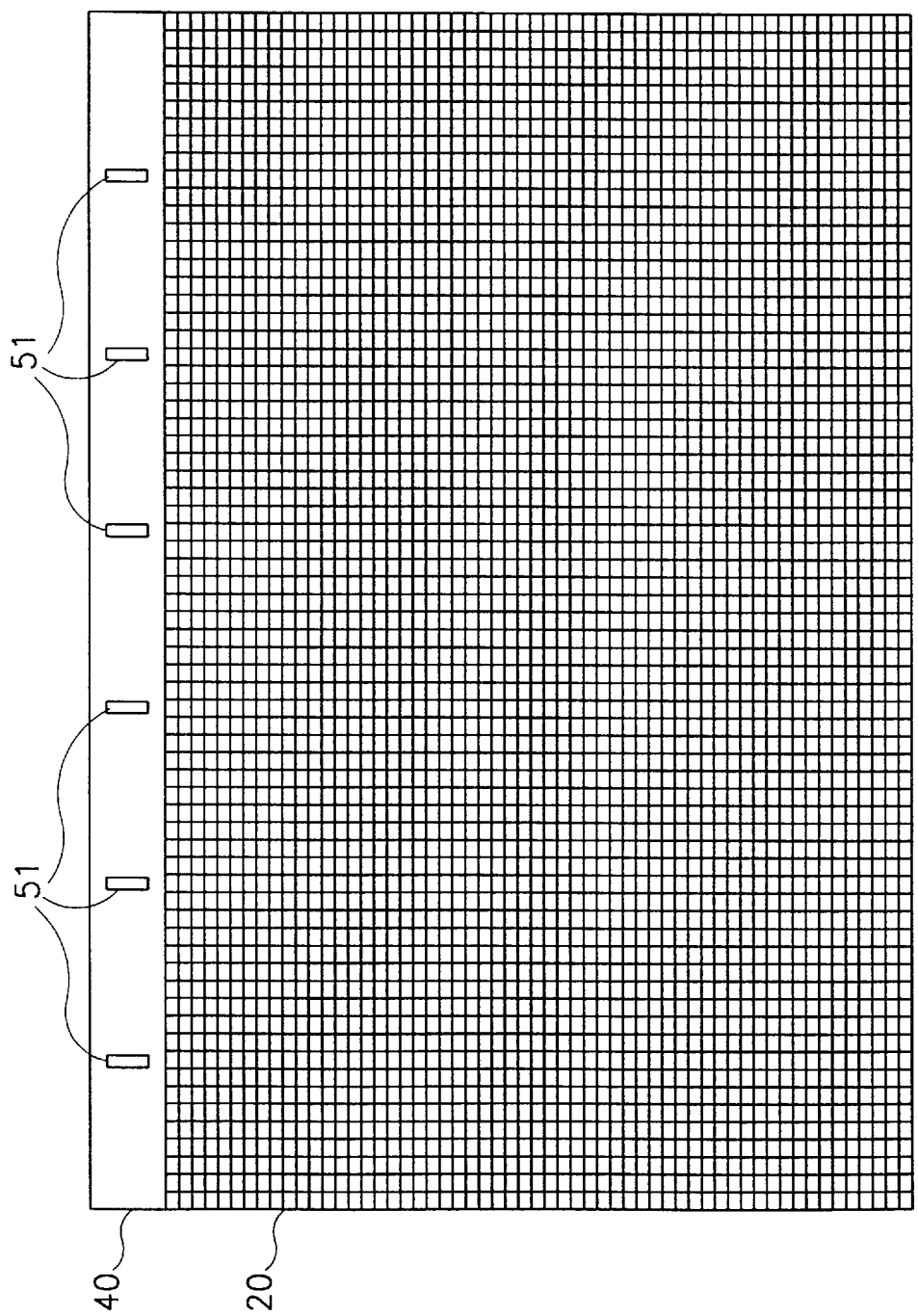
FIG. 8 is a front view of a matrix LCA Masking Pattern Generator of FIG. 7, including film-holders and transparency detection system.
Figure 9:
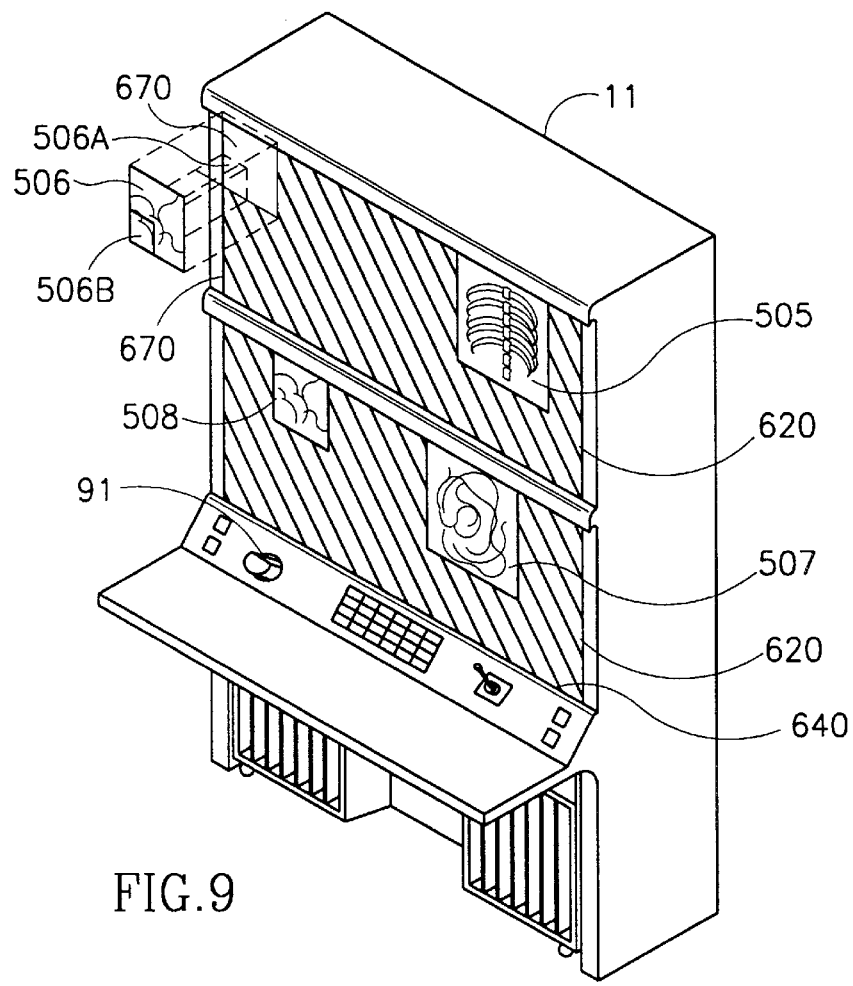
FIG. 9 is a perspective view of an alternative embodiment of the viewing device of FIG. 1, featuring an attached motorized Transparencies Changer provided with a Masking Pattern Generator, a Bar Scanner, a Touch Screen, four transparencies and an ROI.
Figure 12:
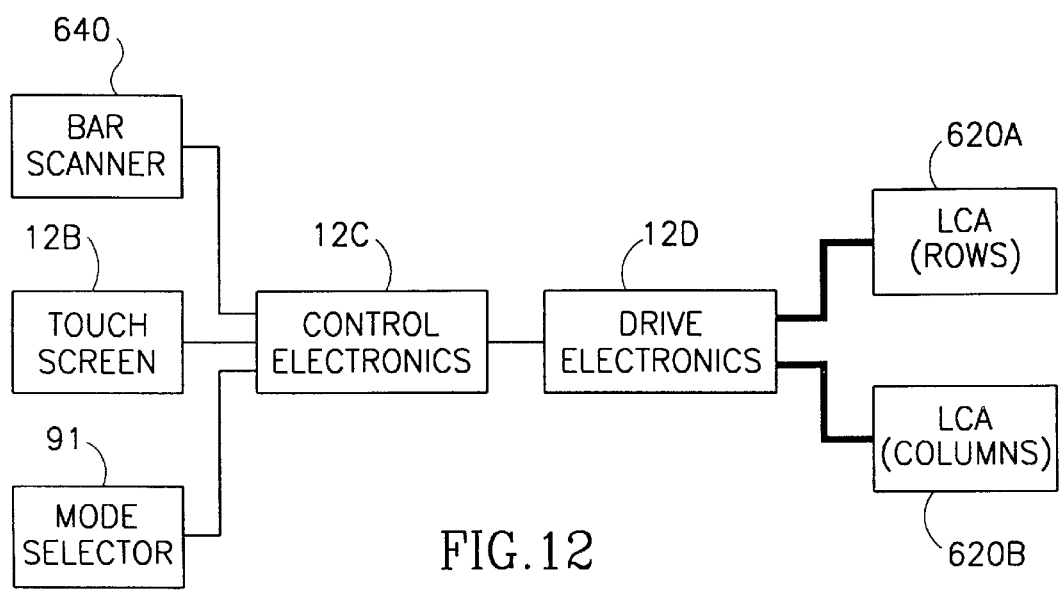
FIG. 12 is a block diagram of the electronic circuitry of the embodiment shown in FIGS. 9 through 11, using an Optical Bar Scanner, two LCA plates each of which is segmented in a stripe pattern, and combining a Masking Pattern Generator and a Touch Screen.

In a further improvement a mask pattern generator having a matrix segmentation similar to that of FIG. 8 is used in the apparatus of FIG. 9. The matrix elements are individually addressable by Drive Electronics 12D which is operative to adjust the level of transmission of the LCA to any one of a plurality of different levels. Control Electronics 12C transmits signals to Drive Electronics 12D, based on the values of transmission for elemental areas of the transparency, to adjust the transmitted light level outside the transparency to the average light level over the transparency, and to vary the light level over the transparency, such that the different areas of the transparency have similar light transmissions. Since the matrix is much coarser (preferably each element has an area of greater than 4 $mm^2$) than the details to be detected on the transparency these variations do not obscure these details, rather they allow for better visualization of the details due to better eye adaptation.

In order to reduce a checkerboard effect which may be present in this embodiment, preferably the EOMD includes a layer of diffuser type liquid crystal, which is operative on command to change state from a transparent state to a diffuser state.

Figure 13:
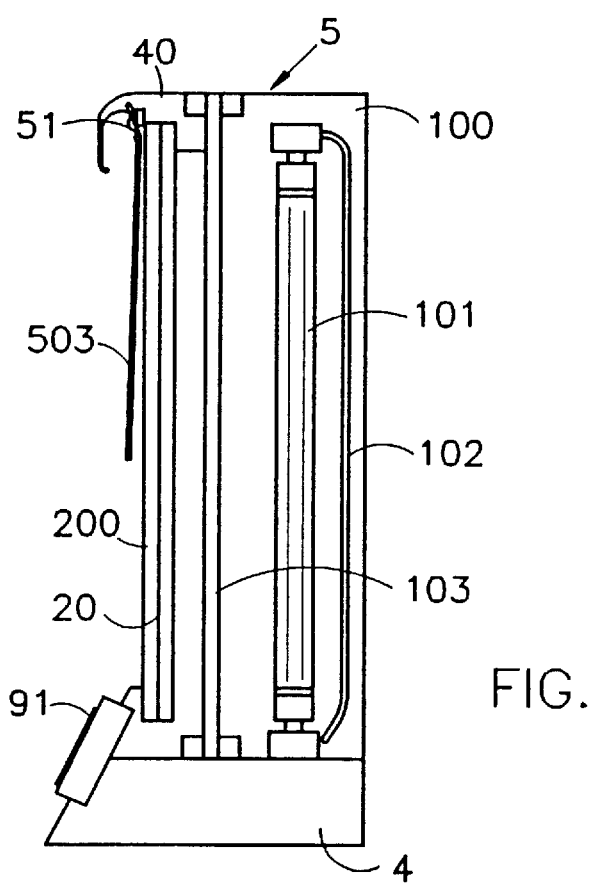
FIG. 13 shows a cross-sectional view of a device according to a preferred embodiment of the invention in which two layers of liquid crystal devices are used.

FIG. 13 shows a cross-sectional view of a device in which two layers of liquid crystal are employed. In one embodiment of the invention, the inner layer of liquid crystal 20 has the configuration shown in FIG. 10 and the outer layer 200 has the configuration shown in FIG. 11. In a second embodiment of the invention, the outer layer is a liquid crystal having selective transparent and diffusing states. In a third embodiment of the invention both layers 20 and 200 have the same array configuration.

When Mode Selector 91 is in ROI mode, an indication by the observer of transparencies of an outline of ROI 506B in transparency 506 for example, within space 670 will activate Touch Screen Device 12B which, in turn, reports the locus of ROI 506B to Control Electronics 12C. This in turn relates the data to the mapped light distribution in the transparencies 505 through 508, effecting the masking of light by the LCA 620A and 620B in all areas of display, except 506A, which is the ROI. Similarly, if the Mode Selector 91 is in Dim Mode, or in Area Contract Mode, or in Area Explode Mode, the Touch Screen Device 12B, Control Electronics 12C and LCA 620A and 620B, are used to dim the light in the ROI, or to contract the area of the ROI, or to explode the area of the ROI, respectively.

While the invention has been generally described in embodiments where the EOMD comprises a LCA (which in a preferred embodiments is a Polymer Dispersed Liquid Crystal or a Thermo-Optical Liquid Crystal), an Electrochromatic Metal Oxide device, or other suitable device having variable transmission is possible. Furthermore a number of layers of any of such devices may be used having similar or different segmentation arrangements.

Furthermore the illuminator can be a segmented flat sheet light emitting device or an array of light emitting devices whose intensity is spatially varied in accordance with the principles described above using the various detection apparatus described to determine the intensity of various parts of the light source.

While the invention has been described for direct viewing backlighted embodiments, other embodiments of the invention are possible using the same inventive ideas. For example, in a projector for transparencies a mask generator can be provided adjacent to the transparency for masking the transparency and its surroundings to improve uniformity and visual adaptation. Further, the mask generating means can be made part of a microscope, again to improve uniformity and visual adaptation.

Although various embodiments, forms and modifications have been shown, described and illustrated above in some detail in accordance with the invention, it will be understood that the descriptions and illustrations are offered merely by way of examples, and that the invention is not limited thereto but encompasses all variations and alternatives falling within the scope of the appended claims and is to be limited in scope only by these appended claims.

We claim:

1. Apparatus for facilitating viewing a transparency comprising:
    a display area;
    means for mounting a transparency in front of the display area;
    a source of illumination which provides backlighting toward the display area; and
    a mask generator comprising a plurality of addressable liquid crystal elements, said mask generator being disposed forward of said illumination source and being capable of selectively generating one of a plurality of masking patterns, said selected pattern varying the amount of light passing through at least one portion of said display area, wherein said mask generator includes a liquid crystal layer having selectively transparent and light diffusing states.

2. Apparatus according to claim 1 and further comprising:
    a transparency locus detector which detects at least one locus associated with the transparency; and
    a controller responsive to said detection which selects a masking pattern suitable for masking the transparency.

3. Apparatus according to claim 1 and further comprising means for mapping the opacity of the transparency.

4. Apparatus according to claim 1 and further comprising:
    a diffuser layer intermediate the source of illumination and the mask generator.

5. Apparatus according to claim 1 wherein said liquid crystal elements comprise a matrix of liquid crystal elements.

6. Apparatus according to claim 1 wherein the mask generator comprises at least two layers of liquid crystal elements.

7. Apparatus according to claim 6 wherein the liquid crystal elements of the two layers have substantially dissimilar geometries.

8. Apparatus according to claim 6 wherein the liquid crystal elements of the two layers have substantially similar geometries.

9. Apparatus according to claim 1 and further comprising:
a controller which controls said mask generator, said controller comprising at least one position sensor for detecting at least one position on the transparency indicated by the operator.

10. Apparatus according to claim 9 wherein said at least one position sensor comprises a touch screen.

11. Apparatus according to claim 10 wherein said touch screen comprises position detecting elements underlying the display area.

12. Apparatus according to claim 1 and further comprising means for transporting said transparency from a transparency store to the display area.

13. Apparatus for facilitating viewing a transparency having an area by an observer comprising:
a display area;
means for mounting a transparency in front of the display area;
a source of illumination which provides substantially uniform backlighting toward at least a portion of said display area which is capable of containing at least a part of the transparency and at least a part of a region surrounding the transparency; and
a mask generator comprising a plurality of addressable liquid crystal elements, said mask generator being disposed forward of said illumination source and being capable of generating a selected pattern providing a first, substantially uniform, back illumination of a first portion of said display area, wherein said first portion is capable of being defined by a transparency's area when a transparency is mounted on said display area, and a second, substantially uniform, illumination of areas outside of the area of the first portion.

14. Apparatus according to claim 13 wherein said liquid crystal elements comprise a matrix of liquid crystal elements.

15. Apparatus according to claim 13 and further comprising:
a transparency locus detector which detects at least one locus associated with the transparency; and
a controller responsive to said detection which selects a masking pattern suitable for masking the transparency.

16. Apparatus according to claim 15 wherein the liquid crystal elements of the two layers have substantially similar geometries.

17. Apparatus according to claim 13 and further comprising means for mapping the opacity of the transparency.

18. Apparatus according to claim 13 and further comprising:
a diffuser layer intermediate the source of illumination and the mask generator.

19. Apparatus according to claim 18 wherein the diffuser layer is a liquid crystal device having selectively a transparent and a light diffusing state.

20. Apparatus according to claim 18 wherein the mask generator comprises at least two layers of liquid crystal elements.

21. Apparatus according to claim 20 wherein the liquid crystal elements of the two layers have substantially dissimilar geometries.

22. Apparatus according to claim 20 wherein one of the layers is a liquid crystal device having selectively a transparent and a light diffusing state.

23. Apparatus according to claim 13 and further comprising:
a controller which controls said mask generator, said controller comprising at least one position sensor for detecting at least one position on the transparency indicated by the operator.

24. Apparatus according to claim 23 wherein said at least one position sensor comprises a touch screen.

25. Apparatus according to claim 24 wherein said touch screen comprise position detecting elements underlying the display area.

26. Apparatus according to claim 13 and further comprising, means for transporting said transparency from a transparency store to the display area.

27. Apparatus for facilitating viewing a transparency having an area by an observer comprising:
a display area;
means for mounting a transparency in front of the display area;
means for determining at least one loci of a transparency when a transparency is mounted in front of the display area;
a source of illumination which provides backlighting toward said display area; and
a mask generator comprising a plurality of addressable liquid crystal elements, said masking generator being disposed forward of said illumination source and being capable of selectively generating one of a plurality of masking patterns according to at least one portion of said display area, said at least one portion relating to said at least one loci, said selected pattern varying the amount of light passing through said at least one portion of said display area; and
a control system which activates said mask generator to provide different relative illumination in said at least one portion relative to other portions of the display area responsive to selection of said at least one portion by an observer whereby visual perception of the transparency in said at least one portion is improved,
wherein the at least one portion comprises an area which is less than an area capable of being, defined by a transparency's area when a transparency is mounted on said display area.

28. Apparatus according to claim 27 comprising means for increasing or reducing illumination in said at least one portion.

29. Apparatus according to claim 27 including means for expanding or contracting the area of said different relative illumination.

30. Apparatus according to claim 27 comprising means for moving the borders of said at least one portion.

31. Apparatus for facilitating viewing a transparency, having an area, by an observer comprising:
a display area;
means for mounting a transparency in front of the display area;
a source of illumination which provides backlighting towards said display area; and
a mask generator, having no moving parts, which is disposed in front of said illumination source said mask generator is selectively capable of providing a relatively uniform illumination over at least one region of interest constituting a first portion of said display area and substantially no illumination outside said first portion, said first portion being smaller than and within a second portion of the display area which is capable of being defined by a transparency's area when a transparency is mounted on said display area, whereby visual perception of the transparency in said region of interest is improved, said region of interest being smaller than said second portion.

32. Apparatus according to claim 31 wherein said mask generator is operative to increase or reduce illumination in said region of interest.

33. Apparatus according to claim 31 including means for expanding or contracting the area of said region of interest.

34. Apparatus according to claim 31 and further comprising means for mapping the opacity of the transparency.

35. Apparatus according to claim 31 and further comprising:

a diffuser layer intermediate the source of illumination and the mask generator.

36. Apparatus according to claim 35 wherein the diffuser layer is a liquid crystal device having selectively a transparent and a light diffusing state.

37. Apparatus according to claim 31 wherein the mask generator comprises at least two layers of liquid crystal elements.

38. Apparatus according to claim 37 wherein the liquid crystal elements of the two layers have substantially dissimilar geometries.

39. Apparatus according to claim 37 wherein the liquid crystal elements of the two layers have substantially similar geometries.

40. Apparatus according to claim 31 wherein one of the layers is a liquid crystal device having selectively a transparent and a light diffusing state.

41. Apparatus according to claim 31 and further comprising:

a controller which controls said mask generator, said controller comprising at least one position sensor for detecting at least one position on the transparency indicated by the operator.

42. Apparatus according to claim 41 wherein said at least one position sensor comprises a touch screen.

43. Apparatus according to claim 42 wherein said touch screen comprises position detecting elements underlying the display area.

44. Apparatus according to claim 31 and further comprising, means for transporting said transparency from a transparency store to the display area.

45. Apparatus according to claim 31 wherein the mask generating device comprises an array of addressable liquid crystal elements.

46. Apparatus according to claim 45 wherein said array of liquid crystal elements comprises a matrix of liquid crystal elements.

47. Apparatus according to claim 31 and further comprising:

a transparency locus detector which detects at least one locus associated with the transparency; and a controller responsive to said detection which selects a masking pattern suitable for masking the transparency.

48. Apparatus for facilitating viewing a transparency, having an area, by an observer comprising:

a display area;

means for mounting a transparency in front of the display area;

a source of illumination which provides substantially uniform illumination toward said display area; and a mask generator comprising a plurality of independently addressable liquid crystal elements, said mask generator being disposed in front of said illumination source and being capable of selectively generating one of a plurality of masking patterns, a selected pattern varying the amount of light passing through a portion of said display area when a transparency is mounted on said portion of the display area; and a controller which controls said mask generator, said controller comprising at least one position sensor for detecting at least one position in said portion of the display area indicated by an operator.

49. Apparatus according to claim 48 wherein said at least one position sensor comprises a touch screen.

50. Apparatus according to claim 49 wherein said touch screen comprise position detecting elements underlying the display area.

51. A method for viewing transparencies comprising:

transporting at least one transparency from a transparency storage magazine to a viewing position on a display area;

determining the loci of the at least one transparency by scanning the at least one transparency during its transport from the magazine to the viewing position;

providing substantially uniform back-illumination towards the display area; and masking the display area by varying the amount of light reaching an observer through the display area in accordance with the determination of the loci of the at least one transparency.

52. Apparatus for facilitating viewing a transparency having an area by an observer comprising:

a display area;

means for mounting a transparency in front of the display area;

a source of illumination which provides backlighting toward said display area; and a mask generator comprising a plurality of addressable liquid crystal elements, said masking generator being disposed forward of said illumination source and being capable of generating a selected pattern providing a first, substantially uniform, back illumination in a first region of interest corresponding to a first portion of said display area and substantially no illumination outside said first portion, said first portion being situated within and smaller than a second portion of the display area which is capable of being defined by a transparency's area when a transparency is mounted on said display area.

53. Apparatus according to claim 52 wherein said liquid crystal elements comprise a matrix of liquid crystal elements.

54. Apparatus according to claim 52 and further comprising:

a transparency locus detector which detects at least one locus associated with the transparency; and a controller responsive to said detection which selects a masking pattern suitable for masking the transparency.

55. Apparatus according to claim 52 and further comprising means for mapping the opacity of the transparency.

56. Apparatus according to claim 52 and further comprising:

a diffuser layer intermediate the source of illumination and the mask generator.

57. Apparatus according to claim 56 wherein the diffuser layer is a liquid crystal device having selectively a transparent and a light diffusing state.

58. Apparatus according to claim 56 wherein the mask generator comprises at least two layers of liquid crystal elements.

59. Apparatus according to claim 58 wherein the liquid crystal elements of the two layers have substantially dissimilar geometries.

60. Apparatus according to claim 58 wherein the liquid crystal elements of the two layers have substantially similar geometries.

61. Apparatus according to claim 58 wherein one of the layers is a liquid crystal device having selectively a transparent and a light diffusing state.

62. Apparatus according to claim 52 and further comprising:

a controller which controls said mask generator, said controller comprising at least one position sensor for detecting at least one position on the transparency indicated by an operator.

63. Apparatus according to claim 62 wherein said at least one position sensor comprises a touch screen.

64. Apparatus according to claim 63 wherein said touch screen comprise position detecting elements underlying the display area.

65. Apparatus according to claim 52 and further comprising, means for transporting said transparency from a transparency store to the display area.

* * * * *